(12) United States Patent
Murakami et al.

(10) Patent No.: US 11,274,172 B2
(45) Date of Patent: Mar. 15, 2022

(54) PROCESSING ADDITIVE, MOLDING COMPOSITION MASTERBATCH OF PROCESSING ADDITIVE AND MOLDING ARTICLE

(75) Inventors: Shinji Murakami, Osaka (JP); Ken Okanishi, Osaka (JP); Masahiko Oka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 261 days.

(21) Appl. No.: 13/005,916

(22) Filed: Jan. 13, 2011

(65) Prior Publication Data

US 2011/0172338 A1 Jul. 14, 2011

Related U.S. Application Data

(63) Continuation of application No. PCT/JP2010/064978, filed on Aug. 26, 2010.

(60) Provisional application No. 61/294,572, filed on Jan. 13, 2010, provisional application No. 61/237,613, filed on Aug. 27, 2009.

(51) Int. Cl.
| | |
|---|---|
| *C08F 214/18* | (2006.01) |
| *C08F 214/22* | (2006.01) |
| *C08L 23/02* | (2006.01) |
| *C08K 3/34* | (2006.01) |

(52) U.S. Cl.
CPC .......... *C08F 214/18* (2013.01); *C08F 214/22* (2013.01); *C08L 23/02* (2013.01); *C08K 3/34* (2013.01)

(58) Field of Classification Search
CPC .............................. C08F 214/18; C08F 214/22
USPC .................................................. 525/199, 200
See application file for complete search history.

(56) References Cited

U.S. PATENT DOCUMENTS

| | | | |
|---|---|---|---|
| 2,968,649 A * | 1/1961 | Pailthorp et al. ..... | C08F 214/22 524/546 |
| 4,141,874 A | 2/1979 | Oka et al. | |
| 4,615,850 A * | 10/1986 | Pecsok ................... | C08J 9/0023 264/45.9 |
| 4,797,440 A * | 1/1989 | Schofield et al. ............ | 524/239 |
| 4,855,360 A | 8/1989 | Duchesne et al. | |
| 6,906,137 B2 | 6/2005 | Oriani et al. | |
| 7,220,487 B2 * | 5/2007 | Halladay ........................ | 428/421 |
| 7,538,156 B2 | 5/2009 | Barriere et al. | |
| 10,308,800 B2 * | 6/2019 | Okanishi ..................... | C08J 3/22 |
| 2003/0100680 A1 | 5/2003 | Oriani | |
| 2003/0199639 A1 * | 10/2003 | Coates et al. ............... | 525/326.2 |
| 2005/0043456 A1 * | 2/2005 | Oriani ............................ | 524/285 |
| 2006/0008651 A1 * | 1/2006 | Day ............................... | 428/421 |
| 2006/0286446 A1 * | 12/2006 | Chun ....................... | B32B 27/12 429/142 |
| 2008/0015298 A1 * | 1/2008 | Xiong et al. ................... | 524/432 |
| 2009/0082510 A1 * | 3/2009 | Miyamori ................ | C08J 3/226 524/429 |
| 2009/0202759 A1 * | 8/2009 | O'Brien .................... | B32B 1/08 428/35.2 |
| 2009/0233099 A1 * | 9/2009 | Maziers ................ | B29C 41/003 428/412 |
| 2011/0021690 A1 * | 1/2011 | Nishimura et al. ........... | 524/505 |

FOREIGN PATENT DOCUMENTS

| | | |
|---|---|---|
| CA | 2 593 024 A1 | 6/2006 |
| JP | 52-062391 A | 5/1977 |
| JP | 02-070737 A | 3/1990 |
| JP | 2002-544358 A | 12/2002 |
| JP | 2007-510003 A | 4/2007 |
| JP | 4181042 B2 | 11/2008 |
| WO | 00/69967 A1 | 11/2000 |
| WO | 02066544 A2 | 8/2002 |
| WO | 03/040232 A1 | 5/2003 |

OTHER PUBLICATIONS

Zeffle GK flyer, 2010.*
Atofina, Plastics Additives & Compounding, Jan. 2002.*
Kynar Arkema flyer, 2015.*
Naoko Sumi et al., "Fluoropolymer Dispersions for Coatings", The Waterborne Symposium, Advances in Sustainable Coating Technologies, Jan. 30-Feb. 1, 2008 (8 Pages total).
Takashi Takayanagi et al., "Progress of fluoropolymers on coating applications Development of mineral spirit soluble polymer and aqueous Dispersion", Progress in Organic Coatings, vol. 40, 2000, pp. 185-190 (6 pages total).
S.R. Oriani "Optimizing Process Aid Performance by Controlling Fluoropolymer Particle Size", Hal Archives-ouvertes (hal-00572059), Journal of Plastic Film & Sheeting, vol. 21, Jul. 2005, pp. 179-198 ( 21 pages total).

* cited by examiner

Primary Examiner — Irina Krylova
(74) Attorney, Agent, or Firm — Sughrue Mion, PLLC

(57) ABSTRACT

The present invention provides a processing additive which can bring about improvements in moldability at Mooney viscosity levels at which the dispersibility in a melt-processable resin is high and which further can work at reduced addition levels. The present invention is a processing additive comprising a fluoropolymer having an acid value of not lower than 0.5 KOH mg/g.

5 Claims, No Drawings

PROCESSING ADDITIVE, MOLDING COMPOSITION MASTERBATCH OF PROCESSING ADDITIVE AND MOLDING ARTICLE

CROSS-REFERENCE TO RELATED APPLICATIONS

This application (i) is a continuation of PCT/JP 2010/064978 filed Aug. 26, 2010 which claims benefit of Provisional Application No. 61/237,613 filed Aug. 27, 2009; and (ii) claims benefit of Provisional Application No. 61/294,572 filed Jan. 13, 2010.

TECHNICAL FIELD

The present invention relates to a processing additive, a molding composition, a masterbatch of processing additive and a molded article.

BACKGROUND ART

For realizing productivity improvement and cost reduction in processing a melt-processable thermoplastic polymer, it is necessary to extrude the polymer at a high rate. However, every melt-processable thermoplastic polymer composition always has a critical shear rate and, at rates exceeding this rate, a phenomenon of surface roughening, namely the so-called melt fracture, occurs, leading to failure to obtain a good molded article.

It is known that a fluoropolymer is useful as a processing additive for correcting these weaknesses and attaining higher rates of extrusion. For example, Patent Document 1 discloses a unimodal fluoroelastomer processing additive comprising two fluoroelastomers differing in Mooney viscosity by at least 15. Further, Patent Document 2 discloses a multimode fluoropolymer processing additive comprising two fluoropolymers showing a melt index ratio of 2:1 to 100:1.

Such prior art technologies as mentioned above intend to shorten the time required for disappearance of melt fracture and/or achieve improvement with respect to the critical shear rate by addition of a high Mooney viscosity fluoroelastomer or a low melt index fluoropolymer, namely a high viscosity fluoropolymer. However, a high viscosity fluoropolymer is low in dispersibility in a resin and like a molding material and cause the appearance of a gel defect or die build-up. Therefore, a processing additive which is low in viscosity and still can bring about improvements in moldability is desired.

Meanwhile, Patent Document 3 discloses, as a technology which uses a fluoropolymer as a processing additive, an extrudable composition comprising a thermoplastic hydrocarbon polymer, a poly(oxyalkylene)polymer and a fluorocarbon polymer. Further, Patent Document 4 discloses an extrudable composition comprising a resin blend consisting of a metallocene-catalyzed linear low-density polyethylene resin and a low-density polyethylene resin, a fluoroelastomer having a Mooney viscosity (ML(1+10), 121° C.) of 30 to 60 and an interfacial agent.

CITATION LIST

Patent Literature

Patent Document 1: Japanese Patent No. 4181042
Patent Document 2: Japanese Kohyo (Laid-open under PCT) Publication 2002-544358
Patent Document 3: Japanese Kokai (Laid-open) Publication H02-70737
Patent Document 4: Japanese Kohyo Publication 2007-510003

SUMMARY OF INVENTION

Technical Problems

In view of the above-discussed state of the art, it is an object of the present invention to provide a processing additive which can bring about improvements in moldability at Mooney viscosity levels at which the dispersibility in a melt-processable resin is high and which further can work at reduced addition levels.

Solution to Problem

As a result of intensive investigations made by the present inventors in an attempt to develop a processing additive having a high moldability-improving effect irrespective of a viscosity of a fluoropolymer, it was found that a fluoropolymer increased in acid value can display excellent characteristics required of a processing additive. Since while the acid value of a fluoropolymer mainly depends on the number of acidic groups which the fluoropolymer has, those acidic groups cause accelerated decreases in curability, the art has endeavored to develop means for reducing the number of such acidic groups, namely causing decreases in acid value. For example, Japanese Kokai Publication H08-301940 describes the production of a fluoroelastomer substantially free of any acidic terminal groups by using an organic peroxide as an initiator. Further, such two-stage polymerization as described in Japanese Kokai Publication S52-62391 also results in a decreased number of acidic groups.

In this manner, a fluoropolymer having a small number of acidic groups, namely having a low acid value, has so far been used in the art. However, the investigations made by the present inventors paying attention to a fluoropolymer from the acid value viewpoint that has so far not been the focus of attention gave a novel finding that when a fluoropolymer having a high acid value is used as a processing additive to be added to a melt-processable resin, such fluoropolymer exhibits excellent processing additive performance characteristics and, even when the fluoropolymer is low in viscosity, it provides a melt-processable resin with improved moldability. Such finding has now led to completion of the present invention.

Thus, the present invention provides a processing additive comprising a fluoropolymer having an acid value of not lower than 0.5 KOH mg/g.

The invention also provides a molding composition comprising the above-mentioned processing additive and a melt-processable resin.

The invention further provides a masterbatch of the processing additive comprising the above-mentioned processing additive and a melt-processable resin.

The invention still further provides a molded article obtained by molding the above-mentioned molding composition.

In the following, the invention is described in detail.

The processing additive according to the invention comprises a fluoropolymer having an acid value of not lower than 0.5 KOH mg/g. The fluoropolymer having an acid value of not lower than 0.5 KOH mg/g has good characteristics as a processing additive and, even when it has a low viscosity, can shorten the time required for disappearance of melt fracture. By this, not only the time required for disappearance of melt fracture can be reduced but also the problems encountered with a conventional processing additive, namely the development of a gel defect and the occurrence of die build-up, which are readily encountered when a high-viscosity fluoropolymer is used, can be inhibited. As a result, a rate of extrusion can be increased and the processing additive addition level can be reduced on the occasion of extrusion molding of a masterbatch or molded article so as to achieve improvements in productivity and reductions in cost. The acid value of a fluoropolymer is the number of milligrams of potassium hydroxide required to neutralize the carboxyl and like acidic groups which one gram of the fluoropolymer has.

The fluoropolymer preferably has an acid value of not lower than 0.6 KOH mg/g, more preferably not lower than 0.7 KOH mg/g, more preferably not lower than 0.7 KOH mg/g, still more preferably not lower than 0.8 KOH mg/g. When the acid value is within the above range, the time required for disappearance of melt fracture of the melt-processable resin can be reduced. The acid value of the fluoropolymer can be measured by potentiometric titration according to JIS K 0070. In the measurement, a 0.01 mol/L potassium hydroxide solution in ethanol may be used in lieu of a 0.1 mol/L potassium hydroxide solution in ethanol. The potentiometric titration method is the method of acid value determination which comprises dissolving a sample (fluoropolymer) in a solvent and subjecting the solution to potentiometric titration with an ethanolic potassium hydroxide solution using a potentiometric titrator.

In a fluoropolymer, there is (are) generally formed a terminal group(s) derived from a polymerization initiator and/or a chain transfer agent used. The acid value of the fluoropolymer mainly depends on such a terminal group, and a fluoropolymer having an acid value of not lower than 0.5 KOH mg/g can be produced by selecting the polymerization initiator and the chain transfer agent, among others. As regards a method of producing a fluoropolymer having an acid value of not lower than 0.5 KOH mg/g, it is preferable to carry out the polymerization with the polymerization initiator alone, without using any chain transfer agent, since the acid value can readily increase. Ammonium persulfate is preferred as the polymerization initiator, and the polymerization is more preferably carried out with ammonium persulfate alone.

Thus, the above-mentioned fluoropolymer is preferably one obtained by polymerization using ammonium persulfate alone as the polymerization initiator, without using any chain transfer agent. When the polymerization is carried out with ammonium persulfate alone, the polymer formed has ammonium persulfate-derived terminal groups at each end thereof. Fearing that a fluoropolymer obtained by such a manner of polymerization may be poor in curability, the art has carried out the polymerization using another initiator and a chain transfer agent so that the terminal groups of the product fluoropolymer may not be acidic ones; in this case, the acid value is low.

The fluoropolymer preferably have an acidic terminal group. The acidic terminal group is not particularly restricted but is preferably at least one group selected from the group consisting of carboxyl group, hydroxyl group, sulfate group, sulfonic group and acidic fluoride group.

The fluoropolymer can be obtained by a conventional method of polymerization, for example by suspension polymerization, solution polymerization, emulsion polymerization or bulk polymerization. In such polymerization, the temperature, pressure and other conditions and the polymerization initiator and other additives to be used can be properly selected according to a composition and the quantity of a desired fluoropolymer.

It is disclosed in Japanese Kokai Publications H07-18035, H07-25952, H07-25954, H07-173230 and H07-173447, among others, that an adhesion of a fluoropolymer to a metal or inorganic material can be improved by providing a fluoropolymer with carboxyl or a like terminal group. However, those documents contain no description about the use, as a processing additive, of a fluoropolymer having an increased acid value resulting from an increased number of terminal groups.

The fluoropolymer is a polymer containing fluorine atoms respectively bound to the main chain-constituting carbon atoms and may be either a homopolymer or a copolymer. The processing additive according to the invention may be one containing one single fluoropolymer species; in a preferred mode of embodiment, however, it contains two or more fluoropolymer species.

The fluoropolymer is preferably a fluoroelastomer. The fluoroelastomer is not particularly restricted but may be any noncrystalline fluoropolymer having rubber elasticity.

The fluoropolymer preferably has a Mooney viscosity (ML(1+10)) of not higher than 60, more preferably not higher than 50, still more preferably not higher than 40, as measured at 121° C. in accordance with ASTM D-1646. Also in the fields of use where the resin is used in its natural or uncolored state or where defect-causing gel is a problem phenomenon, e.g. in thin products (films etc.), the fluoropolymer having a Mooney viscosity within the above range can reduce the gel, hence is applicable. In cases where the processing additive is applied in manufacturing a colored product, thick product or like product for which gel produces no problematic defects, no restriction is imposed on the Mooney viscosity.

In cases where the processing additive comprises two or more fluoropolymer species, as mentioned later herein, it is preferred that a Mooney viscosity of every fluoropolymer species be within the above range. In cases where the fluoropolymer mixture is obtained by cocoagulation or the like technique, it is sufficient that the whole fluoropolymer mixture has a Mooney viscosity within the above range.

The fluoropolymer preferably comprises at least one monomer unit selected from the group consisting of vinylidene fluoride [VdF], vinyl fluoride, tetrafluoroethylene [TFE], hexafluoropropylene [HFP], perfluoro(alkyl vinyl ether) [PAVE], perfluoro(alkoxyalkyl vinyl ether), chlorotrifluoroethylene [CTFE], trifluoroethylene, a monomer represented by the formula (1):

$$CH_2=CX^1(CF_2)_nX^2 \qquad (1)$$

(wherein $X^1$ is H or F, $X^2$ is H, F or Cl and n is an integer of 1 to 10), ethylene, propylene, 1-butene, 2-butene, and vinylidene chloride.

As the above-mentioned fluoropolymer, there may be mentioned, for example, a vinylidene fluoride [VdF] copolymer and a tetrafluoroethylene [TFE] copolymer, among others.

The VdF copolymer include a VdF/hexafluoropropylene [HFP] copolymer, a VdF/chlorotrifluoroethylene [CTFE]

copolymer, a VdF/TFE copolymer, a VdF/perfluoro(alkyl vinyl ether) [PAVE] copolymer, a VdF/TFE/HFP copolymer, a VdF/TFE/CTFE copolymer, a VdF/TFE/PAVE copolymer and the like.

The TFE copolymer include a TFE/propylene copolymer and a TFE/PAVE copolymer, among others.

The fluoropolymer is preferably a VdF copolymer. The VdF copolymer preferably has a VdF unit content of 10 to 90 mole percent, more preferably 25 to 85 mole percent, relative to all the monomer units.

The VdF copolymer is a copolymer comprising VdF units and units derived from the other monomer copolymerizable with VdF. The proportion of the VdF units to the sum of units derived from the other monomers copolymerizable with VdF is such that the VdF units account for 25 to 90 mole percent and the sum of units derived from the other monomers copolymerizable with VdF accounts for 75 to 10 mole percent; more preferably, the VdF units account for 50 to 85 mole percent and the sum of units derived from the other monomers copolymerizable with VdF accounts for 50 to 15 mole percent. The other monomer copolymerizable with VdF preferably comprises at least one monomer selected from the group consisting of TFE, HFP and PAVE, among others.

Preferred as the PAVE is one represented by the formula $CF_2=CF-ORf^1$ (wherein $Rf^1$ is a perfluoroalkyl group containing 1 to 8 carbon atoms), for example PMVE, PEVE, PPVE and the like.

In particular, the fluoropolymer is preferably a vinylidene fluoride-hexafluoropropylene copolymer [VdF/HFP copolymer]. The VdF/HFP copolymer is preferably a copolymer substantially consisting of a VdF and a HFP unit alone but may be one containing a unit derived from a monomer copolymerizable with VdF and HFP. In one preferred mode of embodiment, the fluoropolymer is, for example, a vinylidene fluoride-hexafluoropropylene-tetrafluoroethylene copolymer [VdF/TFE/HFP copolymer]. In a preferred mode of embodiment, the VdF/TFE/HFP copolymer is a copolymer consisting of a VdF, a HFP and a TFE unit alone.

The monomer unit so referred to herein, such as the above-mentioned "VdF unit", is a monomer-derived moiety in the molecular structure of the copolymer in question. In the case of a VdF-derived monomer unit, for instance, it means a moiety represented by $-[CF_2-CH_2]-$. The VdF unit content or the like monomer unit content is a value obtained by performing $^{19}F$-NMR analysis.

The processing additive according to the invention produces its effect by the fluoropolymer adhering to a die, a cylinder and a screw, among others, and thereby coating them. While the die, the cylinder and the screw are generally made of metal, the fluoropolymer shows increased adhesiveness to metals owing to its having a large number of acidic groups, with the result that a rate of coating increases and the effect thereof is produced rapidly. The fluoropolymer is not wholly consumed for adhesion but is partly discharged as well. The increase in the rate of adhesion results in an increased contribution of coating toward the die, the cylinder, the screw and so forth. When a processing additive comprising a fluoropolymer having an acid value of not lower than 0.5 KOH mg/g according to the invention is used, it also becomes possible to reduce the processing additive addition level.

In a preferred mode of embodiment, the processing additive according to the invention further comprises 1% to 99% by weight of an interfacial agent in addition to the fluoropolymer. The combined use of the fluoropolymer mentioned above and the interfacial agent makes it possible to attain processing additive performance characteristics at levels at least comparable to those attainable without the use of the interfacial agent even when the amount of the fluoropolymer is reduced. The content of the interfacial agent is more preferably 5% to 90% by weight, still more preferably 10% to 80% by weight, particularly preferably 20% to 70% by weight. The interfacial agent content is also preferably not lower than 50% by mass and likewise preferably in excess of 50% by mass.

The "interfacial agent" so referred to herein is a compound showing a melt viscosity lower than that of the fluoropolymer at a molding temperature. When it is contained in the molding composition to be described later herein, it is preferably a compound showing a melt viscosity lower than that of the melt-processable resin at the molding temperature and capable of wetting the surface of the fluoropolymer. It is a compound different from the fluoropolymer and from the melt-processable resin.

The interfacial agent preferably comprises at least one interfacial agent selected from the group consisting of a silicone-polyether copolymer, a aliphatic polyester, an aromatic polyester, a polyether polyol, a amine oxide, a carboxylic acid, an aliphatic ester, and a poly(oxyalkylene). Those interfacial agents are lower in melt viscosity than the fluoropolymer. Therefore, when admixed with the fluoropolymer, such an interfacial agent can wet the surface of the fluoropolymer and thus functions sufficiently as an interfacial agent. More preferably, it is a poly(oxyalkylene).

Polyethylene glycol is preferred as the poly(oxyalkylene). The polyethylene glycol preferably has a number average molecular weight of 50 to 20000, more preferably 1000 to 15000, still more preferably 2000 to 9500. The number average molecular weight of the polyethylene glycol is a value calculated from a hydroxyl value determined in accordance with JIS K 0070.

The processing additive according to the invention preferably contains 1 to 30 parts by weight, per 100 parts by weight of the fluoropolymer, of an antiblocking agent. By this, it becomes possible to inhibit sticking of the fluoropolymer. The amount of the antiblocking agent is preferably 3 to 20 parts by weight, more preferably 5 to 15 parts by weight. The antiblocking agent may comprise a single species or two or more species.

The antiblocking agent is preferably an inorganic compound in powder form. For example, it is preferably such a plasticizer, a filler, a coloring agent, an acid acceptor, a heat stabilizer or a like inorganic compound as mentioned below.

Usable as the antiblocking agent are, for example, compounds or materials generally used as a plasticizer, a filler, a coloring agent, an acid acceptor and a heat stabilizer, among others.

As the above-mentioned plasticizer, there may be mentioned dioctyl phthalate, dicresyl phthalate and the like.

As the above-mentioned filler, there may be mentioned barium sulfate, calcium carbonate, graphite, talc, silica and the like.

As the above-mentioned coloring agent, there may be mentioned titanium oxide, iron oxide, molybdenum oxide and a like metal oxide.

As the above-mentioned acid acceptor, there may be mentioned magnesium oxide, calcium oxide, lead oxide and the like.

As the above-mentioned heat stabilizer, there may be mentioned calcium stearate, magnesium stearate and the like.

The antiblocking agent is preferably one of the filler mentioned above. In particular, the antiblocking agent more preferably comprises at least one species selected from the group consisting of talc, silica and calcium carbonate.

The antiblocking agent is preferably a powder having an average particle diameter of not smaller than 0.01 μm but not larger than 50 μm. The average particle diameter of the powder is more preferably not smaller than 0.05 μm but not larger than 30 μm, still more preferably not smaller than 0.1 μm but not larger than 10 μm. The average particle diameter of the antiblocking agent is a value determined in accordance with ISO 13320-1. The antiblocking agent may also be one surface-treated with a coupling agent, for instance, according to need.

The processing additive according to the invention may further contain, in addition to the constituents mentioned above, one or more additives selected from among an antioxidant, an ultraviolet absorber, a flame retardant and so forth, according to need.

The molding composition according to the invention comprises a melt-processable resin and the above-mentioned processing additive according to the invention. The term "melt-processable resin" as used herein means a polymer the melt flow rate of which at a temperature higher than the crystalline melting point thereof can be measured in accordance with ASTM D-1238 and D-2116.

The above-mentioned melt-processable resin is not particularly restricted but is preferably a fluorine-free resin. For example, mention may be made of a polyolefin resin such as polyethylene and polypropylene; a polyamide [PA] resin such as nylon 6, nylon 11, nylon 12, nylon 46, nylon 66, nylon 610, nylon 612 and nylon MXD6; a polyester such as poly(ethylene terephthalate) [PET], poly(butylene terephthalate) [PBT], a polyarylate, an aromatic polyester (including a liquid crystal polyester) and a polycarbonate [PC]; a polyacetal [POM] resin; a polyether resin such as poly(phenylene oxide) [PPO], a modified poly(phenylene ether) and a polyetheretherketone [PEEK]; a polyamideimide [PAI] resin such as polyaminobismaleimide; a polysulfone type resin such as a polysulfone [PSF] and a polyethersulfone [PES]; a vinyl polymer such as a ABS resin and poly(4-methylpentene-1) (TPX resin) and, further, poly(phenylene sulfide) [PPS], a polyketonesulfide, a polyetherimide, a polyimide [PI] and so forth. The nylon MXD6 mentioned above is a crystalline polycondensate obtained from metaxylenediamine [MXD] and adipic acid.

Preferred as the melt-processable resin is a polyolefin resin and/or a PA resin, among others, and the polyolefin resin is more preferred.

The melt-processable resin in the above-mentioned molding composition is preferably a thermoplastic resin in view of a ready moldability thereof. In the molding composition according to the invention, the melt-processable resin may comprise one single or two or more melt-processable resins.

The melt-processable resin mentioned above preferably has a melt-processing temperature of 100° C. to 350° C. The melt-processable resin may have crystallinity or may have no crystallinity.

When the melt-processable resin has crystallinity, it preferably has a melting point of 80° C. to 300° C., more preferably 100° C. to 200° C. When it has no crystallinity, the melt-processable resin preferably has a processing temperature range almost comparable to that of a crystalline melt-processable resin having a specified melting range. The melting point of a melt-processable resin having crystallinity can be measured using a DSC instrument.

The above-mentioned melt-processable resin can be synthesized, for example, by a conventional method selected according to the kind thereof.

The melt-processable resin may occur as a powder, granules or pellets, among others. The pellet form is preferred, however, since that form makes it possible to efficiently melt the melt-processable resin and disperse the processing additive in a molding composition obtained.

In the molding composition according to the invention, the fluoropolymer preferably amounts to 0.0001% to 10% by mass of the sum of the mass of the processing additive comprising the fluoropolymer and the mass of the melt-processable resin. The fluoropolymer more preferably amounts to at least 0.001% by mass and preferably to a level not higher than 5% by mass, more preferably not higher than 0.5% by mass, based on the sum of the processing additive comprising the fluoropolymer and the mass of the melt-processable resin.

The above-mentioned molding composition may be one prepared by adding the processing additive according to the invention as such to the melt-processable resin mentioned above or one prepared by adding a masterbatch of processing additive, which is to be described later herein, to the melt-processable resin mentioned above.

The molding composition according to the invention may comprise the other ingredient incorporated therein according to need in addition to the processing additive and melt-processable resin mentioned above.

As for the other ingredient, use may be made, for example, of a reinforcing agent such as a glass fiber and a glass powder; a stabilizer such as a mineral and a flake; a lubricant such as a silicone oil and molybdenum disulfide; a pigment such as titanium dioxide and iron oxide red; an electrically conductive material such as carbon black; an impact strength modifier such as a rubber; an antioxidant such as a hindered phenol antioxidant and a phosphorus-containing antioxidant; an crystal nucleating agent such as a metallic salt and a acetal type sorbitol; and other additives enumerated in a positive list compiled by the Japan Hygienic Olefin and Styrene Plastics Association to provide voluntary standards.

The masterbatch of processing additive according to the invention comprises the above-mentioned processing additive according to the invention and a melt-processable resin. The masterbatch of processing additive according to the invention can be suitably used as a processing additive in molding a melt-processable resin.

The masterbatch of processing additive according to the invention comprises the above-mentioned fluoropolymer uniformly dispersed in a melt-processable resin and therefore, when added on the occasion of molding the melt-processable resin, it can improve a moldability of that resin by reducing an extrusion torque and/or an extrusion pressure, among others.

As the melt-processable resin, there may be mentioned the same ones as those melt-processable resins mentioned hereinabove. Among them, a polyolefin resin is preferred, and polyethylene is more preferred.

The masterbatch of processing additive according to the invention may have any form; it may occur as a powder, granules or pellets, for instance. Pellets obtained by melt kneading are preferred, however, since the fluoropolymer is then retained in a state finely dispersed in the melt-processable resin.

From a ready melt molding viewpoint, the content of the fluoropolymer in the masterbatch of processing additive according to the invention is preferably in excess of 0.1% by mass but not higher than 20% by mass of the sum of the mass of the processing additive composition and the mass of the melt-processable resin. A more preferred lower limit to the fluoropolymer content is 0.3% by mass of the total mass defined above, a still more preferred lower limit thereto is 0.6% by mass, and a more preferred upper limit thereto is 10% by mass.

The masterbatch of processing additive according to the invention may further comprise, together with the above-mentioned processing additive and the above-mentioned melt-processable resin, the other ingredient as incorporated therein according to need.

The other ingredient is not particularly restricted but includes, for example, those enumerated hereinabove referring to the molding composition according to the invention.

While the masterbatch of processing additive according to the invention can be obtained by adding the processing additive, optionally together with one or more desired other ingredients, to the melt-processable resin and kneading the resulting mixture at a temperature of 100° C. to 350° C., it is preferable from a fluoropolymer dispersibility viewpoint that the masterbatch be one obtained by adding the above-mentioned processing additive prepared in advance to the melt-processable resin and kneading the resulting mixture at such a temperature as mentioned above.

The molded article according to the invention is one produced by molding the above-mentioned molding composition according to the invention.

The molding process may comprise preparing the molding composition according to the invention in advance and feeding the composition to a molding machine for effecting melting and extrusion, among others, or may comprise feeding the above-mentioned processing additive and the melt-processable resin simultaneously to a molding machine for effecting melting and extrusion, among others, or may comprise feeding the above-mentioned masterbatch of processing additive and the melt-processable resin simultaneously to a molding machine for effecting melting and extrusion, among others.

The method of molding of the molding composition is not particularly restricted but mention may be made of extrusion molding, injection molding and blow molding, among others. In particular, extrusion molding is preferred for effectively producing the above-mentioned moldability-improving effect.

The conditions for the molding are not particularly restricted but can be properly selected depending on the composition and amount of the molding composition to be used and the shape and size of a desired molded article, among others.

The molding temperature is generally not lower than the melting point of the melt-processable resin in the molding composition but lower than the lower of the decomposition temperature of the processing additive and that of the melt-processable resin and is within a range of 100° C. to 350° C.

In the case of extrusion molding, the above-mentioned molding temperature is sometimes referred to as "extrusion temperature".

The present invention is also a method for extruding the molding composition comprising a step of obtaining the molding composition by adding the above-mentioned processing additive to the melt-processable resin and a step of extruding the molding composition.

The molded article according to the invention may have any of various forms or shapes such as a sheet, a film, a rod, a pipe and a fiber, among others.

A field of use of the molded article mentioned above is not particularly restricted but may vary depending on the melt-processable resin species; for example, the molded article is preferably used when good dynamic or mechanical properties and/or surface properties, in the main, are strongly required.

The field of use of the above molded article includes, among others, various films, a bag, a covering material, a vessel for drinks and the other table utensil, a cable, a pipe, a fiber, a bottle, a gasoline tank, and the other molded article for various industries.

Advantageous Effects of Invention

The processing additive and the masterbatch of processing additive according to the invention, which have the respective constitutions mentioned hereinabove, are more effective in reducing an extrusion pressure, inhibiting melt fracture and improving the moldability as compared with conventional ones. The molding composition according to the invention, which comprises the above-mentioned processing additive, is excellent in moldability. The molded article according to the invention, which is obtained by molding the above molding composition, is excellent in mechanical and dynamic properties.

DESCRIPTION OF EMBODIMENTS

The following examples, including comparative examples, illustrate the present invention in further detail. These examples are, however, by no means limitative of the scope of the present invention.

The measured values reported in the examples and comparative examples are values determined by the methods mentioned below.

1. Copolymer Composition

Measurements were made using a $^{19}$F-NMR spectrometer (Bruker model AC300P).

2. Acid Value

Measurements were made by a potentiometric titration method prescribed in JIS K 0070 except that a 0.01 mol/L ethanolic potassium hydroxide solution was used in lieu of the prescribed 0.1 mol/L ethanolic potassium hydroxide solution.

3. Mooney Viscosity

Measurements were made as ML (1+10) at 121° C. in accordance with ASTM D-1646. The Mooney viscosity data presented in the examples and the comparative examples are the ones obtained under those conditions.

4. Melt Fracture Disappearance Time

The melt-processable resin alone was extruded in a state of melt fracture occurring over the entire surface until stabilization of a pressure and, thereafter, at the time when the screw came into sight, the materials, including the processing additive, for making up each formulation were fed into the hopper and, taking that point of time as time 0 (zero), the time required for the disappearance of melt fracture and smoothening of the whole surface of the molded article was recorded as the melt fracture disappearance time. The disappearance of melt fracture was confirmed by the eye and by touching.

5. Pressure Drop and Time Required for Pressure Stabilization

In such an extrusion evaluation as the one to be described later herein, the extrusion pressure drops from the pressure (initial pressure) caused only by the initial charge linear low-density polyethylene containing no processing additive as the processing additive produces its effect and, then, the pressure is stabilized at an almost constant level (stable state pressure). The difference between the initial pressure and the stable state pressure was defined as the pressure drop. The time required for the pressure to arrive at the stable state level was regarded as the time required for pressure stabilization.

(Fluoropolymers)

As for the fluoropolymers used in Examples 1 to 13, those fluoropolymers (fluoroelastomers) having the respective compositions shown in Table 1 were produced by the polymerization method substantially identical to the first step of Example 1 described in Japanese Kokai Publication S52-62391.

Examples 1 to 13 and Comparative Examples 1 to 9

(Preparation of Processing Additives)

Each fluoropolymer was ground using a grinder (Rapid R-1528, product of Kawata Mfg Co., Ltd.), and 7 parts by weight of talc (P-2, product of Nippon Talc Co., Ltd.) and 3 parts by weight of silica (Syloblock 45H, product of W. R. Grace & Co.) were added to 100 parts by weight of the ground fluoropolymer, followed by mixing up using a small-size grinding mill (Millser 300DG, product of Iwatani Corporation) to give the processing additive. In Examples 4 to 7, 9 to 11 and 13 and Comparative Examples 3 to 5 and 7 to 9 a predetermined amount of polyethylene glycol (Carbowax™ Sentry™ Polyethylene Glycol 8000 Granular NF (hereinafter referred to as "PEG"), product of Dow Chemical Company) was admixed with each processing additive after the above mixing up, followed by tumbling to give a PEG-containing processing additive.

(Preparation of Masterbatches)

Thereafter, linear low-density polyethylene (LLDPE 1002YB, product of Exxon Mobil Corporation) was admixed with the above-mentioned processing additive in an amount of 5% by weight based on the total weight of the linear low-density polyethylene and the processing additive, the mixture was fed to a twin-screw extruder (Labo Plastomill 30C150, product of Toyo Seiki Seisaku-Sho, Ltd.) operating at a screw speed of 80 rpm to give the processing additive-containing molded article. The masterbatch of processing additive consisting of the processing additive and the melt-processable resin was prepared under the same conditions as in the preparation of the above-mentioned molded article except that the processing additive-containing molded article obtained was mixed up by tumbling and the screw speed was increased to 100 rpm so as to improve the dispersion uniformity of the processing additive in the masterbatch.

The extrusion conditions were as follows.
(1) Temperatures: cylinder temperature 150° C. to 180° C., die temperature 180° C.;
(2) L/D: 25.

(Extrusion Evaluation 1)

In Examples 1 to 6 and Comparative Examples 1 to 4, the processing additive-containing masterbatch molded in the twin-screw extruder mentioned above was added to linear low-density polyethylene (LLDPE 1201XV Lot. 0000172879, product of Exxon Mobil Corporation) at an addition level of 1% by weight relative to the total weight of the linear low-density polyethylene and masterbatch, followed by mixing up by tumbling. The thus-obtained masterbatch-containing linear low-density polyethylene was extruded through a single-screw extruder (Rheomex OS, L/D: 33, screw diameter: 20 mm, die diameter: 2 mm, product of Haake, Inc.) at a cylinder temperature of 170° C. to 200° C. and a die temperature of 210° C. and at a screw speed of 30 rpm, and a change in melt fracture were observed. In Example 7, the evaluation was made in the same manner as mentioned above except that the masterbatch addition level was 0.2% by weight. In Comparative Example 5, the evaluation was made in the same manner as mentioned above except that the masterbatch addition level was 0.5% by weight.

Prior to each test run, linear low-density polyethylene containing 15% by weight of silica was fed into the hopper, the screw speed was increased to 150 rpm, and purging was conducted for about 15 minutes. Thereafter, the same linear low-density polyethylene as used in testing (LLDPE 1201XV Lot. 0000172879, product of Exxon Mobil Corporation) was fed into the hopper and purging was carried out for about 15 minutes. Then, the screw speed was restored to the original 30 rpm, extrusion was performed until stabilization of the temperature and, after confirmation of the restoration of the initial pressure, the next experiment was started. In case of failure in initial pressure restoration, the purging work mentioned above was repeated until initial pressure restoration and, thereafter, the next experiment was started.

The composition of the fluoropolymer, the composition of the processing additive, the evaluation results and other data as obtained in each example are shown below in Table 1. In Table 1, the amount of the processing additive is an amount of the processing additive relative to the total weight of the linear low-density polyethylene and the masterbatch mentioned above.

TABLE 1

| | Fluoropolymer composition (mol %) | | | Processing additive composition (parts by weight) | | | | Acid value (KOH mg/g) | Mooney viscosity | Processing addtive amount (ppm) | Pressure drop (MPa) | Time required for pressure stabilization (minutes) | Melt fracture disappearance time (minutes) |
|---|---|---|---|---|---|---|---|---|---|---|---|---|---|
| | VdF | HFP | TFE | Fluoropolymer | Talc | Silica | PEG | | | | | | |
| Example 1 | 78 | 22 | 0 | 100 | 7 | 3 | 0 | 1.4 | 29 | 500 | 5.5 | 34 | 32 |
| Example 2 | 74 | 26 | 0 | 100 | 7 | 3 | 0 | 1.0 | 45 | 500 | 5.3 | 17 | 10 |
| Example 3 | 67 | 15 | 18 | 100 | 7 | 3 | 0 | 1.3 | 34 | 500 | 5.3 | 34 | 30 |
| Example 4 | 78 | 22 | 0 | 100 | 7 | 3 | 200 | 1.4 | 29 | 500 | 5.3 | 11 | 9 |
| Example 5 | 74 | 26 | 0 | 100 | 7 | 3 | 200 | 1.0 | 45 | 500 | 5.2 | 17 | 10 |
| Example 6 | 67 | 15 | 18 | 100 | 7 | 3 | 200 | 1.3 | 34 | 500 | 5.7 | 25 | 24 |
| Example 7 | 78 | 22 | 0 | 100 | 7 | 3 | 200 | 1.4 | 29 | 100 | 4.0 | 31 | 26 |
| Comp. Ex. 1 | 78 | 22 | 0 | 100 | 7 | 3 | 0 | 0.1 | 45 | 500 | 2.8 | 95 | No disappearance |

TABLE 1-continued

|  | Fluoropolymer composition (mol %) | | | Processing additive composition (parts by weight) | | | | Acid value (KOH mg/g) | Mooney viscosity | Processing addtive amount (ppm) | Pressure drop (MPa) | Time required for pressure stabilization (minutes) | Melt fracture disappearance time (minutes) |
|---|---|---|---|---|---|---|---|---|---|---|---|---|---|
|  | VdF | HFP | TFE | Fluoropolymer | Talc | Silica | PEG |  |  |  |  |  |  |
| Comp. Ex. 2 | 78 | 22 | 0 | 100 | 7 | 3 | 0 | 0.2 | 36 | 500 | 2.5 | 75 | No disappearance |
| Comp. Ex. 3 | 78 | 22 | 0 | 100 | 7 | 3 | 200 | 0.1 | 45 | 500 | 3.8 | 70 | 54 |
| Comp. Ex. 4 | 78 | 22 | 0 | 100 | 7 | 3 | 200 | 0.2 | 36 | 500 | 2.8 | 73 | 83 |
| Comp. Ex. 5 | 78 | 22 | 0 | 100 | 7 | 3 | 200 | 0.1 | 45 | 250 | 1.4 | 114 | No disappearance |

As shown in Table 1, the use of the processing additive according to the invention resulted in very rapid disappearance of melt fracture and larger pressure drops as compared with the comparative examples. Furthermore, the effects were more marked in those examples in which PEG was added as the interfacial agent. In Comparative Examples 1 and 2, melt fracture did not completely disappear even after arrival at the stable pressure. Even when the level of addition of the processing additive according to the invention is reduced, sufficient effects are produced, as evidenced in Example 7. In Comparative Example 5, in which the addition level was lowered, the effects of the processing additive could not be produced to a satisfactory extent.

(Extrusion Evaluation 2)

In Examples 8 to 13 and Comparative Examples 6 to 9, the processing additive-containing masterbatch molded in the twin-screw extruder mentioned above was added to linear low-density polyethylene (LLDPE 1201XV Lot. 512431, product of Exxon Mobil Corporation) at an addition level of 1.5% by weight relative to the total weight of the linear low-density polyethylene and masterbatch, followed by mixing up by tumbling. The thus-obtained masterbatch-containing linear low-density polyethylene was extruded through a single-screw extruder (VS 20 m/m extruder, L/D: 24, screw diameter: 20 mm, die diameter: 2 mm, product of TANABE PLASTICS MACHINERY CO., LTD.) at a cylinder temperature of 230° C. and a die temperature of 230° C. and at a screw speed of 30 rpm, and a change in melt fracture were observed.

Prior to each test run, linear low-density polyethylene containing 15% by weight of silica was fed into the hopper, the screw speed was increased to 80 rpm, and purging was conducted for about 30 minutes. Thereafter, the same linear low-density polyethylene as used in testing (LLDPE 1201XV Lot. 512431, product of Exxon Mobil Corporation) was fed into the hopper and purging was carried out for about 30 minutes. Then, the screw speed was restored to the original 30 rpm, extrusion was performed until stabilization of the temperature and, after confirmation of the restoration of the initial pressure, the next experiment was started. In case of failure in initial pressure restoration, the purging work mentioned above was repeated until initial pressure restoration and, thereafter, the next experiment was started.

The composition of the fluoropolymer, the composition of the processing additive, the evaluation results and other data as obtained in each example are shown below in Table 2. In Table 2, the amount of the processing additive is an amount of the processing additive relative to the total weight of the linear low-density polyethylene and the masterbatch mentioned above.

TABLE 2

|  | Fluoropolymer composition (mol %) | | | Processing additive composition (parts by weight) | | | | Acid value (KOH mg/g) | Mooney viscosity | Processing addtive amount (ppm) | Pressure drop (MPa) | Time required for pressure stabilization (minutes) | Melt fracture disappearance time (minutes) |
|---|---|---|---|---|---|---|---|---|---|---|---|---|---|
|  | VdF | HFP | TFE | Fluoropolymer | Talc | Silica | PEG |  |  |  |  |  |  |
| Example 8 | 78 | 22 | 0 | 100 | 7 | 3 | 0 | 1.4 | 29 | 750 | 7.2 | 25 | 27 |
| Example 9 | 78 | 22 | 0 | 100 | 7 | 3 | 50 | 1.4 | 29 | 750 | 6.9 | 28 | 27 |
| Example 10 | 78 | 22 | 0 | 100 | 7 | 3 | 200 | 1.4 | 29 | 750 | 6.9 | 30 | 32 |
| Example 11 | 78 | 22 | 0 | 100 | 7 | 3 | 400 | 1.4 | 29 | 750 | 6.3 | 35 | 42 |
| Example 12 | 78 | 22 | 0 | 100 | 7 | 3 | 0 | 0.67 | 31 | 750 | 7.4 | 31 | 30 |
| Example 13 | 78 | 22 | 0 | 100 | 7 | 3 | 200 | 0.67 | 31 | 750 | 7.1 | 27 | 25 |
| Comp. Ex. 6 | 78 | 22 | 0 | 100 | 7 | 3 | 0 | 0.1 | 45 | 750 | 6.1 | 45 | No disappearance |
| Comp. Ex. 7 | 78 | 22 | 0 | 100 | 7 | 3 | 50 | 0.1 | 45 | 750 | 6.3 | 40 | No disappearance |
| Comp. Ex. 8 | 78 | 22 | 0 | 100 | 7 | 3 | 200 | 0.1 | 45 | 750 | 6.1 | 45 | No disappearance |
| Comp. Ex. 9 | 78 | 22 | 0 | 100 | 7 | 3 | 400 | 0.1 | 45 | 750 | 5.6 | 62 | No disappearance |

As shown in Table 2, melt fracture did not completely disappear by extruder evaluation of 90 minutes in Comparative Examples 6 to 9. On the other hand, melt fracture completely disappeared in a short time in Examples 8 to 13 in which the processing additive according to the invention was used.

Furthermore, regardless of ratios of PEG and the fluoropolymer, melt fracture completely disappeared in a short time in Example 8 to 13.

INDUSTRIAL APPLICABILITY

The processing additive and the masterbatch of processing additive according to the invention, which have the respective constitutions mentioned hereinabove, can be utilized in a wide range of applications, for example in manufacturing various films, a bag, a covering material, a vessel for drinks and the other table utensil, a cable, a pipe, a fiber, a bottle, a gasoline tank, and the other molded article for various industries.

The invention claimed is:

1. A molding composition comprising a processing additive and a melt-processable resin,
    wherein the molding composition contains 0.05% to 0.075% by mass of the processing additive based on the sum of the mass of the processing additive and the mass of the melt-processable resin,
    wherein the processing additive comprises a fluoroelastomer and an interfacial agent, wherein the content of the fluoroelastomer is 0.01% to 0.03% by mass based on the sum of the mass of the processing additive and the mass of the melt-processable resin, and the content of the interfacial agent is 60% to 65% by weight based on the processing additive,
    wherein the fluoroelastomer has an acid value of from 0.67 to 1.4 KOH mg/g,
    wherein the fluoroelastomer is a vinylidene fluoride/hexafluoropropylene copolymer, or a vinylidene fluoride/tetrafluoroethylene/hexafluoropropylene copolymer,
    wherein the melt-processable resin is a linear low-density polyethylene,
    wherein a mole percentage of the vinylidene fluoride unit in the fluoroelastomer is 74 to 78 mole percent,
    wherein the interfacial agent is a polyethylene glycol,
    wherein the molding composition has a melt fracture disappearance time of 9 to 27 minutes when measured as follows:
    the linear low-density polyethylene alone is extruded in an extruder in a state of melt fracture occurring over the entire surface until stabilization of a pressure and coming into sight of a screw in the extruder;
    when the screw in the extruder comes into sight, the processing additive is fed into a hopper, at which point a point of time of feeding is taken as a time 0 (zero);
    the time required for disappearance of the melt fracture and smoothening of the whole surface of a molded article from the time 0 is defined as the melt fracture disappearance time,
    wherein:
    the extruder is a single-screw extruder Rheomex OS, having a L/D of 33, a screw diameter of 20 mm, and a die diameter of 2 mm;
    a cylinder temperature is 170 to 200° C.;
    a die temperature is 210° C.; and
    a screw speed is 30 rpm,
    and wherein the time required for pressure stabilization is 11 to 31 minutes.

2. A molded article obtained by molding the molding composition according to claim 1.

3. The molding composition according to claim 1, wherein the fluoroelastomer is a vinylidene fluoride/tetrafluoroethylene/hexafluoropropylene copolymer.

4. The molding composition according to claim 1, wherein the fluoroelastomer is a vinylidene fluoride/hexafluoropropylene copolymer.

5. A molding composition comprising a processing additive and a melt-processable resin,
    wherein the molding composition contains 0.05% to 0.075% by mass of the processing additive based on the sum of the mass of the processing additive and the mass of the melt-processable resin,
    wherein the processing additive comprises a fluoroelastomer and an interfacial agent, wherein the content of the fluoroelastomer is 0.01% to 0.03% by mass based on the sum of the mass of the processing additive and the mass of the melt-processable resin, and the content of the interfacial agent is 60% to 65% by weight based on the processing additive,
    wherein the fluoroelastomer comprises acidic end groups that are derived from a polymerization initiator and provide an acid value of from 0.67 to 1.4 KOH mg/g,
    wherein the fluoroelastomer is a vinylidene fluoride/hexafluoropropylene copolymer, or a vinylidene fluoride/tetrafluoroethylene/hexafluoropropylene copolymer,
    wherein the melt-processable resin is a linear low-density polyethylene,
    wherein a mole percentage of the vinylidene fluoride unit in the fluoroelastomer is 74 to 78 mole percent,
    wherein the interfacial agent is a polyethylene glycol,
    wherein the molding composition has a melt fracture disappearance time of 9 to 27 minutes when measured as follows:
    the linear low-density polyethylene alone is extruded in an extruder in a state of melt fracture occurring over the entire surface until stabilization of a pressure and coming into sight of a screw in the extruder;
    when the screw in the extruder comes into sight, the processing additive is fed into a hopper, at which point a point of time of feeding is taken as a time 0 (zero);
    the time required for disappearance of the melt fracture and smoothening of the whole surface of a molded article from the time 0 is defined as the melt fracture disappearance time,
    wherein:
    the extruder is a single-screw extruder Rheomex OS, having a L/D of 33, a screw diameter of 20 mm, and a die diameter of 2 mm;
    a cylinder temperature is 170 to 200° C.;
    a die temperature is 210° C.; and
    a screw speed is 30 rpm,
    and wherein the time required for pressure stabilization is 11 to 31 minutes.

* * * * *